Jan. 2, 1951  A. M. STONER ET AL  2,536,519
LATHE CHUCK
Filed Aug. 23, 1948   3 Sheets-Sheet 1
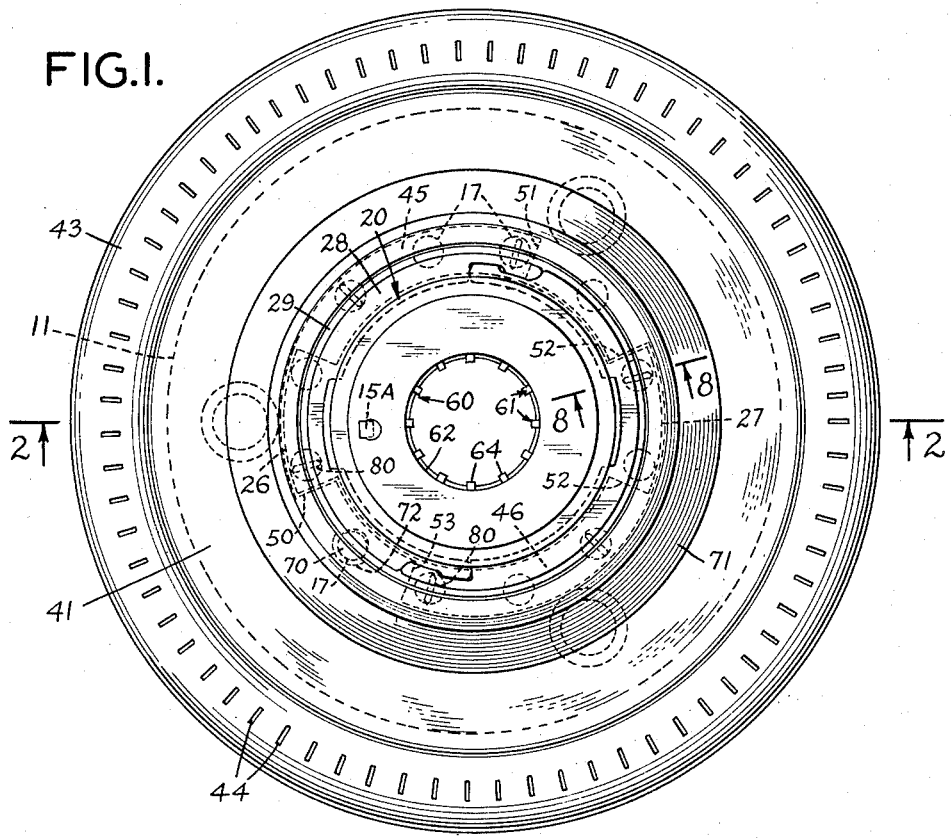
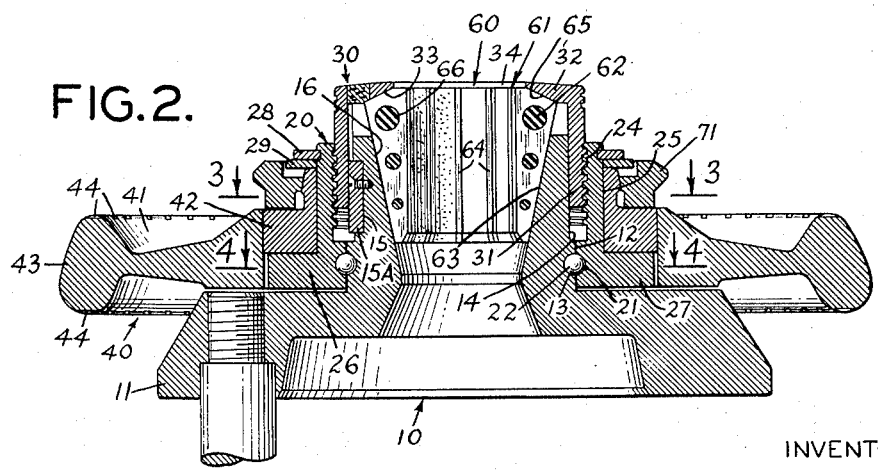
INVENTORS.
ARTHUR MERRICK STONER
CARL BERNHARD BRINK
BY
E. W. Marshall
ATTORNEY.

Jan. 2, 1951 A. M. STONER ET AL 2,536,519
LATHE CHUCK
Filed Aug. 23, 1948 3 Sheets-Sheet 2

INVENTORS.
ARTHUR MERRICK STONER
CARL BERNHARD BRINK
BY E. W. Marshall
ATTORNEY.

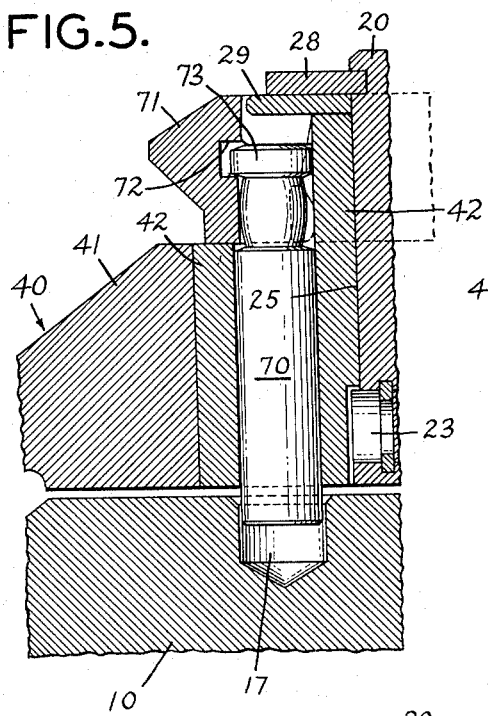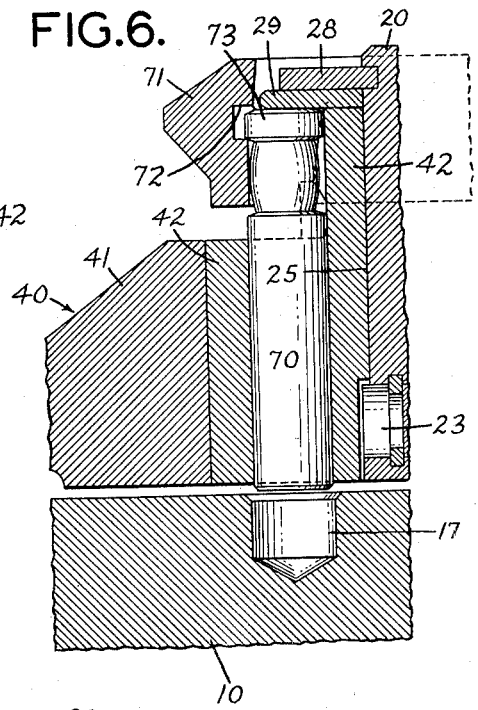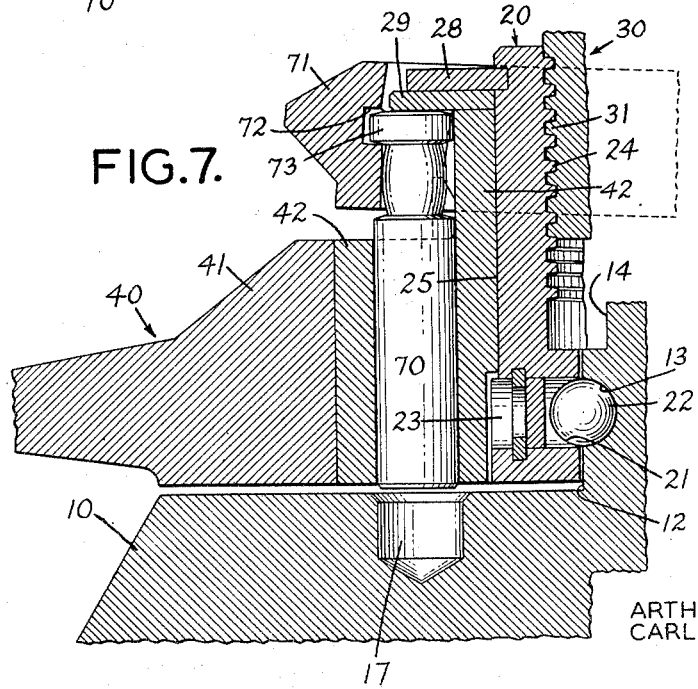

Patented Jan. 2, 1951

2,536,519

UNITED STATES PATENT OFFICE 2,536,519

LATHE CHUCK

Arthur Merrick Stoner and Carl Bernhard Brink, West Hartford, Conn., assignors to The Jacobs Manufacturing Company, Hartford, Conn., a corporation of Connecticut Application August 23, 1948, Serial No. 45,648

7 Claims. (Cl. 279—52)

This invention relates to a lathe chuck, and its object is to provide a simple and rugged structure which includes a body, a collet, an actuating mechanism for the collet, including an outwardly extending shock collar with a lost-motion hammer-blow connection, for increasing the grip of the collet upon an inserted article and for releasing the grip of the collet on the article.

A further object is to provide releasable mechanism for locking the shock collar to the body.

Another object is to provide a chuck which is especially adapted for use in heavy-duty precision work and which is also capable of holding fragile articles with a sensitive grip.

These and other objects of the invention will appear in the following specifications, and its novel features will be set forth in claims.

Referring to the drawings,

Fig. 1 is a front elevation of a chuck made according to and embodying this invention;

Fig. 2 is a sectional plan view of the chuck, the section being taken on the line 2—2 of Fig. 1;

Figure 3:
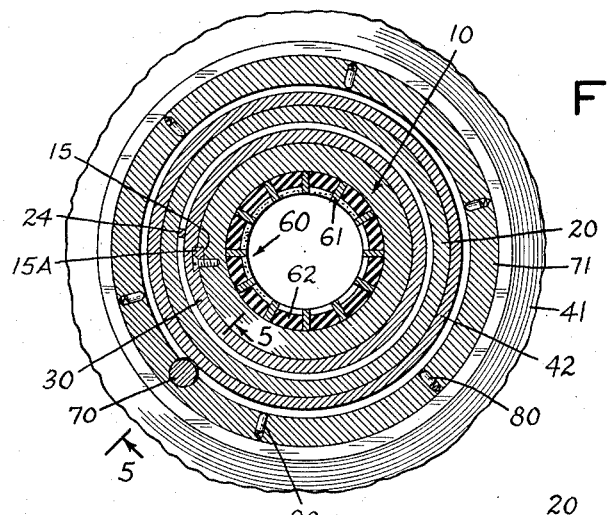
Figure 4:
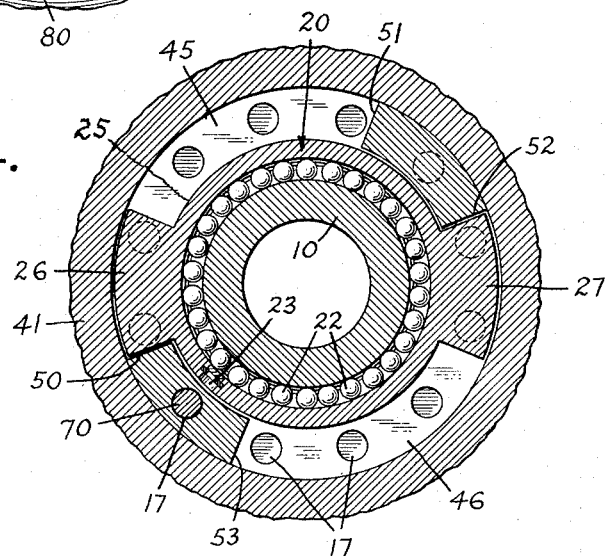
Figure 8:
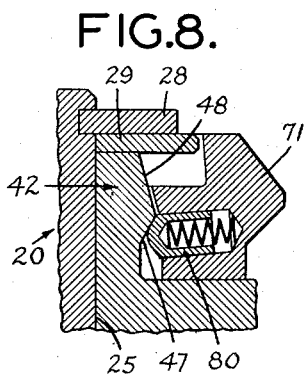
Figure 9:
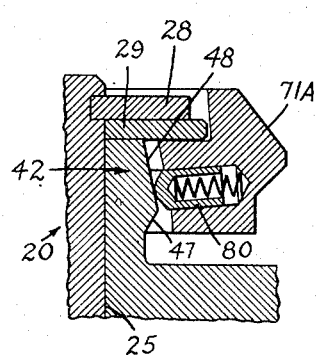

Figs. 3 and 4 are sectional front elevations of parts shown in the preceding figures, the sections being taken respectively on the lines 3—3 and 4—4 of Fig. 2;

Figs. 5, 6 and 7 are sectional plan views on a larger scale, showing the parts of the locking mechanism in different relative positions. These sections are taken on the line 5—5 of Fig. 3; and Figs. 8 and 9 are sectional plan views, taken on the line 8—8 of Fig. 1, of a mechanism for yieldably holding the shock collar locked to the body of the chuck, with the parts of this mechanism shown in different relative positions in these two figures.

10 designates a hollow rotatable body arranged to be attached to and driven by a machine tool, such as a lathe. In the particular form shown, the body has an outwardly extending flange 11 at one end adapted to fit upon the spindle of a lathe or other machine tool and to be affixed thereto by any suitable means. 12 is an outer cylindrical surface on the body adjacent the flange, in which surface is an annular ball-race 13. The outer forward part 14 of the body is also cylindrical but of smaller diameter than the part 12. A longitudinally disposed keyway 15 is cut into this part of the body. 16 is an internal cone-shaped cam surface formed in the forward part of the body.

20 designates an actuating sleeve rotatively mounted on the cylindrical surface 12 of the body. In it is a ball-race 21. Balls 22 are inserted between the ball-races 13 and 21 through a radial hole 23 in the sleeve. These balls prevent relative longitudinal movement between the body 10 and the sleeve 20. The forward part of the sleeve is interiorly threaded as at 24 and overlies the part 14 of the body with clearance. The outside 25 of this forward part of the sleeve is cylindrical. Two diametrically opposed lugs 26 and 27 project outwardly from the rear end of the sleeve.

30 is a pressure member slidably mounted on the part 14 of the body and in the clearance between the body and the actuating sleeve 20. In it is a keyway which engages a key 15a in the keyway 15 in the body and prevents relative rotation between the pressure member and the body. The pressure member has external threads 31, which mesh with the threads 24 on the sleeve, and an inwardly projecting flange 32 at its forward end, which has a beveled inner abutment surface 33 and a clearance opening 34.

40 is a shock collar which, as shown, comprises an external portion 41 and an inner portion 42. The portions 41, 42 are joined by a shrink fit, so that there is no relative movement between them. The external portion extends outwardly from the chuck in the form of a hand-wheel having a smooth rim 43 formed on its periphery. Notches 44 are formed in the edges of the rim. The inner portion 42 forms a hub which is rotatably mounted on the actuating sleeve 20. Two interrupted arcuate grooves 45, 46 are formed in this hub to receive the lugs 26, 27 which project from the sleeve 20.

28 is a split retaining ring engaging an annular groove near the outer end of the actuating sleeve. A washer 29 is interposed between the retaining ring and the forward end of the inner portion 42 of the shock collar and thus the shock collar is retained on the actuating sleeve between its lugs 26, 27 and the washer 29.

The ends of the groove 45 are designated by the reference numerals 50, 51, and the ends of the groove 46 by the numerals 52, 53. As shown in Fig. 4, the lug 26 is abutting the end 50 of groove 45, and the lug 27 is abutting the end 52 of groove 46.

60 designates a collet. In the form shown this is constructed according to Patent 2,346,706, issued August 18, 1941, to Arthur Merrick Stoner, and comprises a plurality of rigid gripping members 61 interconnected by a body 62 of resilient material. The outer edges 63 of the gripping members are tapered at the same angle from the axis of the body 10 as is the cam surface 16.

Their inner edges 64 are parallel with the axis. The forward edges 65 are inclined from the vertical at the angle of inclination of the abutment surface 33 of the pressure member and are arranged to be engaged by that abutment surface. The gripping members may be transversely perforated as at 66, and when they are the resilient material passes through them. Oil resistant synthetic rubber is suitable material for the body 62. The gripping members are radially disposed and angularly spaced equally, and the body 62 preferably is affixed to them, as, for example, by vulcanization.

When the parts are assembled as shown in Figs. 1–4, the forward edges 65 of the gripping members are near the forward end of the pressure member 30. A tool or the like can then be inserted in the collet. Right-hand rotation of the sleeve 20 imparts a rearward movement to the pressure member 30, and thus forces the gripping members inwardly. During this operation the inner edges 64 of the gripping members remain in parallelism with the axis of the conical cam surface and thus center the tool or the like with great nicety.

The actuating sleeve 20 is rotated by the shock collar 40. When the latter, as viewed in Fig. 4, is rotated in a clockwise direction the engagement of the end 50 of the slot 45 with the lug 26, and the engagement of the end 52 of the slot 46 with the lug 27 will rotate the sleeve 20, and thus will move the pressure member 30 backward longitudinally to force the gripping members 61 inward radially. The gripping members may be forced into tight engagement with an article inserted between them by backing the ends 50, 52 away from the lugs 26, 27 and returning them rapidly to impart sudden impacts on the lugs.

The mass of the shock collar is considerably greater than that of the actuating sleeve, and it is further removed from the axis of the chuck so that its momentum produces a powerful tightening effect of the collet upon the article between its gripping members. These sudden impacts may be repeated if desired. When the collet is to be loosened the shock collar 40 is rotated rapidly in the opposite direction to bring the end 51 of slot 45 sharply against the lug 26, and the end 53 of slot 46 against the lug 27. These sudden impacts may be repeated if necessary, and the simultaneous rotation of the shock collar and the actuating sleeve continued until the collet is open and the article between its gripping members is released.

As this apparatus is especially designed for precision work and to have a large range of capacity, a number of collets of different inner dimensions may be furnished with each chuck. It has been found in practice that when the rotation of the chuck is arrested somewhat suddenly, the hand-wheel will continue to rotate because of its momentum. In use on a lathe, for example, the chuck is rotated normally in an anti-clockwise direction. When it is stopped suddenly by applying the lathe spindle brake, there is a tendency for the hand-wheel 40 to rotate on the sleeve 20 in an anti-clockwise direction. This sometimes results in the ends 51, 53 of the slots 45, 46 of the shock collar 42 striking the lugs 26, 27 with sufficient force to loosen the gripping members of the collet from the article engaged between them, with disastrous consequences. We have devised a way of overcoming this difficulty by providing a simple mechanism by means of which the hand-wheel can be locked to the body whenever desired.

The shock collar 40 is locked normally to the body 10 as shown in Fig. 5 by a pin 70 which extends through a part of its inner portion 42 between the end 50 of slot 45 and the end 53 of slot 46, into one of a series of angularly spaced holes 17 formed in the body 10. 71 is a lock ring mounted on an extended part of the inner portion 42 of the shock collar. This ring is provided with an undercut groove 72, into which a portion 73 of the pin 70 extends so that when the lock ring is moved outwardly the pin 70 is moved out of the hole 17 in the body 10, as shown in Figs. 6 and 7, thus permitting the rotation of the shock collar and actuating sleeve in relation to the body. As shown in Fig. 7, the parts are so formed that they will not bind when the pin is withdrawn by tilting the lock ring.

80 designates one of a plurality of angularly spaced spring-pressured lugs in the lock ring 71. These have conical end portions, which bear upon an inclined surface 47 on the inner portion 42 of the shock collar to hold the lock ring against the chuck and to hold the pin 70 in one of the holes 17 in the body 10. It is shown in this position in Fig. 8. The lock ring 71 may be moved outwardly into the position in which it is shown in Fig. 9 at 71A to remove the pin 70 from the hole in the body 10. When in this position the lugs 80 engage an inclined surface 48 on the shock sleeve portion 42 to maintain the lock ring in its released position.

Various modifications in construction, mode of operation, method and use of an invention may and do occur to others, especially after benefiting from knowledge of such a disclosure as that herein presented of the principles involved, but the invention itself is not confined to the present showing.

We claim:

1. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck an external shock collar is rotatably mounted upon the actuating sleeve, with a lost-motion hammer-blow connection provided between the shock collar and the actuating sleeve to limit the rotative relation between said collar and sleeve, combined with releasable means for locking the shock collar and the body together.

2. A chuck having a body, a cam surface within said body inclined to the axis of the body, a longitudinally movable pressure member mounted on the body, a gripping device interposed between the cam surface and the pressure member, an outer rotatable threaded sleeve for actuating the pressure member, and means for preventing relative longitudinal movement between the actuating sleeve and the body, in which chuck an external shock collar is rotatably mounted upon the actuating sleeve and extends outwardly therefrom, with a lost-motion hammer-blow connection provided between the shock collar and the actuating sleeve to limit the rotative relation between said collar and sleeve, combined with releasable means for locking the shock collar and the body together.

3. A chuck having a body, a cam surface withing said body inclined to the axis of the body, a longitudinally movable pressure member mounted on the body, a gripping device interposed between the cam surface and the pressure member, and an outer rotatable sleeve for actuating the pressure member, in which chuck the cam surface is conical and the gripping device is a collet comprising a plurality of angularly spaced radially disposed rigid members, the outer surfaces of which are inclined to the axis of the body and in which an external shock collar is rotatably mounted upon the actuating sleeve, with a lost-motion hammer-blow connection provided between the shock collar and the actuating sleeve to limit the rotative relation between said collar and sleeve, combined with releasable means for locking the shock collar and the body together.

4. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck the cam surface is conical and the gripping device is a collet comprising a plurality of angularly spaced radially disposed rigid members interconnected by a body of resilient material, the outer surfaces of which are inclined to the axis of the body and in which an external shock collar extends outwardly from the sleeve, with a lost-motion hammer-blow connection provided between the shock collar and the actuating sleeve to limit the rotative relation between said collar and sleeve, combined with releasable means for locking the shock collar and the body together.

5. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck an external shock collar is rotatably mounted upon a part of the actuating sleeve, with a lost-motion hammer-blow connection provided between the shock collar and the actuating sleeve to limit the rotative relation between said collar and sleeve, combined with a lock ring mounted on the shock collar and longitudinally movable thereon, and a pin connected with the lock ring and movable therewith passing through the shock collar in a direction parallel to the axis of the chuck, a bore in the body to receive the pin when the lock ring is in one of its positions, said pin being withdrawn from the bore when the lock ring is in another position.

6. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck an external shock collar is rotatably mounted upon a part of the actuating sleeve, with a lost-motion hammer-blow connection provided between the shock collar and the actuating sleeve to limit the rotative relation between said collar and sleeve, combined with a lock ring mounted on the shock collar and longitudinally movable thereon, a pin connected with the lock ring and movable therewith passing through the shock collar in a direction parallel to the axis of the chuck, a bore in the body to receive the pin when the lock ring is in one of its positions, said pin being withdrawn from the bore when the lock ring is in another position, an obliquely disposed surface formed on the shock collar, and a plurality of radially disposed lugs in the lock ring spring-pressed into engagement with said oblique surface.

7. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck an external shock collar is rotatably mounted upon a part of the actuating sleeve, with a lost-motion hammer-blow connection provided between the shock collar and the actuating sleeve to limit the rotative relation between said collar and sleeve, combined with a lock ring mounted on the shock collar and longitudinally movable thereon, a pin connected with the lock ring and movable therewith passing through the shock collar in a direction parallel to the axis of the chuck, a bore in the body to receive the pin when the lock ring is in one of its positions, said pin being withdrawn from the bore when the lock ring is in another position, oppositely inclined adjacent annular surfaces formed on the shock collar, and a plurality of radially disposed lugs in the lock ring spring-pressed into engagement with one of said inclined surfaces when the lock ring is in one of its positions on the shock collar, and with the other inclined surface when the lock ring is in another position on the collar.

ARTHUR MERRICK STONER.
CARL BERNHARD BRINK.

REFERENCES CITED

The following references are of record in the file of this patent:

UNITED STATES PATENTS

| Number | Name | Date |
| --- | --- | --- |
| 1,534,572 | Cutler | Apr. 21, 1925 |
| 1,764,289 | Emrick | June 17, 1930 |
| 2,337,471 | Hines | Dec. 21, 1943 |
| 2,346,706 | Stoner | Apr. 18, 1944 |